(12) United States Patent
Guedalia et al.

(10) Patent No.: US 7,298,830 B2
(45) Date of Patent: Nov. 20, 2007

(54) TELEPHONE AND WIRELESS ACCESS TO COMPUTER NETWORK-BASED AUDIO

(75) Inventors: David Guedalia, Beit Shemesh (IL); Jacob Guedalia, Boston, MA (US)

(73) Assignee: NMS Communications Corporation, Framingham, MA (US)

( * ) Notice: Subject to any disclaimer, the term of this patent is extended or adjusted under 35 U.S.C. 154(b) by 950 days.

(21) Appl. No.: 09/798,377

(22) Filed: Mar. 2, 2001

(65) Prior Publication Data

US 2001/0043684 A1 Nov. 22, 2001

Related U.S. Application Data

(60) Provisional application No. 60/207,127, filed on May 25, 2000, provisional application No. 60/194,854, filed on Apr. 5, 2000.

(51) Int. Cl.
H04M 1/64 (2006.01)
H04M 11/00 (2006.01)
(52) U.S. Cl. .................................. 379/88.17; 379/88.18
(58) Field of Classification Search .............. 379/88.17
See application file for complete search history.

(56) References Cited

U.S. PATENT DOCUMENTS

| 5,799,063 | A | * | 8/1998 | Krane | 379/88.17 |
|---|---|---|---|---|---|
| 6,219,694 | B1 | | 4/2001 | Lazaridis et al. | |
| 6,233,318 | B1 | * | 5/2001 | Picard et al. | 379/88.17 |
| 6,243,445 | B1 | * | 6/2001 | Begeja et al. | 379/93.01 |
| 6,594,348 | B1 | * | 7/2003 | Bjurstrom et al. | 379/88.13 |
| 6,823,370 | B1 | * | 11/2004 | Kredo et al. | 709/206 |
| 6,970,915 | B1 | * | 11/2005 | Partovi et al. | 709/217 |

OTHER PUBLICATIONS

Victor W. Zue, "Navigating the Information Superhighway Using Spoken Language Interfaces", IEEE Expert, Oct. 1995, pp. 39-43.
Matthew Lennig, "Putting Speech Recognition to Work in the Telephone Network", IEEE Institute of Electrical and Electronic Engineers, Aug. 1990, pp. 35-41.
Frank Stajano, et al., "The Thinnest of Clients: Controlling It All Via Cellphone", Mobile Computing and Communications Review, vol. 2, No. 4, Oct. 1998.

(Continued)

Primary Examiner—Fan Tsang
Assistant Examiner—Joseph T Phan
(74) Attorney, Agent, or Firm—Chapin IP Law, LLC; Barry W. Chapin, Esq.

(57) ABSTRACT

This invention discloses a system for transmission of audio content to a telephone, the system including an audio stream navigation functionality operable by using a telephone user interface and enabling a user to select audio data to be heard by the user via said telephone, an interactive voice response unit operative in response to an input from said telephone user interface operating said audio stream navigation functionality and a transcoder operative in response to an input from said interactive voice response unit for providing audio data, from an audio source remote from said transcoder, to said interactive voice response unit for listening by said user via said telephone.

A method for transmission of audio content to a telephone is also disclosed.

25 Claims, 9 Drawing Sheets

OTHER PUBLICATIONS

*Ericsson Demonstrates Plug-in MP3 Player for Mobile Phones at Telecom 99*, Ericsson Press Release, http://www.ericsson.com/press/telecom99/presskit/mp3.html, pp. 1-2, Oct. 199.
*Corporate Press Room—MP3Player for Mobile Phones*, http://www.ericsson.com/press/mp3player.html, 2001, p. 1.
*SQUID Web Proxy Cache*, 2001, www.squid-cache.org, p. 1.
*SQUID Frequently Asked Questions*, D. Wessels, http://www.squid-cache.org/Doc/FAQ/FAQ.html, 2001, pp. 1-9.
*Real.com—RealPlayer and RealJukebox*, http://www.realaudio.com, 2001, pp. 1-2.
*The IMAP Connection*, http://www.imap.org, Jan. 2001, p. 1.
Whatis.com, http://whatis.techtarget.com, 2001, pp. 1-3.
*Shoutmail*, http://www.shoutmail.com, 2001, p. 1.
*DM3 IPLink Release 4*, Dialogic Press Release, http://www.dialogic.com/products, 2001, pp. 1-6.
*BBC World Service on Yahoo! Broadcast*, http://www.broadcast.com/bbc, 2001, pp. 1-2.
*OHP 3000 Digital On-Hold System*, On-Hold Plus OHP 3000 Products, http://www.onholdplus.com/pages/ohp3000.html, 2001, pp. 1-2.

* cited by examiner

TELEPHONE AND WIRELESS ACCESS TO COMPUTER NETWORK-BASED AUDIO

This application claims priority from U.S. Provisional Patent Application 60/207,127 filed May 25, 2000 and entitled NAVIGATION AND EDITING OF AUDIO INFORMATION OVER THE TELEPHONE and from U.S. Provisional Patent Application 60/194,854, filed Apr. 5, 2000, entitled VOICE PORTAL.

FIELD OF THE INVENTION

The present invention relates to computer network telephony in general, and more particularly to methods and apparatus for telephone and wireless access to computer network-based audio.

BACKGROUND OF THE INVENTION

Accessing and listening to computer-network based audio content is currently accomplished by transferring audio content from a computer network, such as the Internet, to an end-user's computer, where the audio content is then played. Until recently, audio content was exclusively stored as a computer file that needed to be completely downloaded to the end-user's computer before it could be played. While the recent development of streaming audio technologies, such as REAL AUDIO®, has provided a measure of concurrency between downloading and playing audio content, a computer with network access is still a required component for retrieving and playing computer-network based audio content.

The process of accessing audio information is composed of many parts. Typically common to all devices is an audio source and multiple clients. When transferring information from an audio source to multiple clients, a number of technologies are typically implemented to make the process more efficient.

One such technology is cache management. Cache management enables enhanced efficiency in the use of bandwidth, so that multiple clients listening to the same information should not have to retrieve it every time from the source.

Normally when downloading audio information, a user downloads from the source to the client and plays the audio from the client side. In a cached environment, the user downloads from the source to a proxy, which caches the information, and from the proxy to the client. It is assumed that the connection between the proxy and the client is better than the connection between the source and the client. An example of a cache management system is Squid (http://www.squid-cache.org).

Another component in servicing audio clients is a streaming server. Streaming is a process by which segments of audio data are transmitted to the client in a way that ensures that the client always has necessary information. A streaming server transmits just the necessary information to the client, for the client to render. At any point in time, the user does not need the complete audio data. For example, when listening to a 3 hour lecture in streaming audio format, the user does not ever need to have the whole 3 hour lecture in memory on the client side. Rather, the user needs only one or two seconds at a time in memory. An example of a streaming audio server is a Real Audio server (www.real-.com )

A client receiving a REAL AUDIO® transmission may find that for some reason the connection has gone bad in the middle of the transmission. One thing a REAL AUDIO® server may do to deal with this is to 'drop off' packets—by dropping a missed segment and skipping to the next segment. This would be preferable if a user were listening to live radio. Alternatively, the server could continue sending data as if nothing has happened. In each case the user would hear quiet followed by the continued transmission. If packets were dropped, some information would not reach the user.

A third technology used for transferring audio information to the client is multicasting. This technology is employed, for example in an MP3 multicasting server, which multicasts streaming audio. A radio station provides an analog source, which is sent to a radio transmitter and to a transcoder which decodes, mixes and encodes the analog source. A client could be, for example, an Ericsson telephone with an MP3 player attached, as described in: (http://www.ericsson.com/press/mp3player.html),(http://www.ericsson.com/press/telecom99/presskit/mp3.html).

Another technology useful in transferring information from an audio source to multiple clients is Voice Over IP (VoIP). VoIP employs transcoders. A standard telephone may connect to a VoIP Gateway. The VoIP gateway converts the telephone signal into a digital signal, encodes it and sends it through a VoIP Server to another gateway, which decodes it and sends it to another telephone. Two telephones can thus communicate over the Internet. It is also known to employ a PBX to provide radio or MP3 music on hold. This is described, inter alia in (http://www.onholdplus.com/pages/ohp3000.html).

SUMMARY OF THE INVENTION

The present invention seeks to provide enhanced telephone functionality, through the use of an Interactive Voice Response Unit (IVR). This functionality may include, for example, an ability to receive a live Internet audio stream via a conventional telephone, navigation and bookmarking of an audio stream, and forwarding audio content, such as an office voicemail, from a PBX connected telephone to a user not directly connected to the PBX.

The present invention seeks to provide methods and apparatus for accessing and retrieving computer-network based audio content via a telephone without requiring that the telephone have computing capabilities.

The present invention allows a user to predefine a set of personal preferences related to audio content via a telephone or a computer for playing audio content on a telephone. The set of personal preferences may be stored on an easily accessible database for later access via telephone. Such personal preferences may include Uniform Resource Locators (URLs) indicating the location of specific audio content on the Internet. The user can access a previously defined set of personal preferences by dialing into an IVR. The user may navigate menus presenting predefined audio content options and make selections by using Dual Tone Multi Frequency (DTMF) and/or voice input. Once the user has made a selection, the present invention retrieves the audio content from the Internet and renders it suitable for audio output at the user's telephone.

In a typical scenario, a user may wish to listen to a world news broadcast, such as the BBC World Service at the URL http://www.broadcast.com/bbc/, while traveling. The user accesses a network server of the present invention, establishes a user name and password, and indicates that he would like to receive the BBC World Service broadcast, typically by providing the associated URL or by selecting a predefined URL. Later, the user places a telephone call to an IVR interface of the present invention and enters his user name and password. The user is then presented with a menu of choices, including URLs that the user previously indicated, typically presented by content category. The user then chooses a category that includes the BBC World Service broadcast and then selects the BBC World Service broadcast. Responsive to this selection, the apparatus of the present invention establishes a network connection with http://www.broadcast.com/bbc/, if such a connection has not earlier been established. The network server receives the news broadcast in a streaming audio format, and then renders the streaming audio to provide a telephone output.

There is thus provided, in accordance with a preferred embodiment of the present invention, a system for transmission of audio content to a telephone, the system including an audio stream navigation functionality operable by using a telephone user interface and enabling a user to select audio data to be heard by the user via a telephone, an interactive voice response unit operative in response to an input from the telephone user interface operating the audio stream navigation functionality, and a transcoder operative in response to an input from the interactive voice response unit for providing audio data, from an audio source remote from the transcoder, to the interactive voice response unit for listening by the user via the telephone.

Also provided, in accordance with another preferred embodiment of the present invention, is a method for transmission of audio content to a telephone, the system including providing a telephone user interface, enabling a user, using the telephone user interface, to select audio data to be heard by the user via a telephone, operating audio stream navigation functionality on a basis of an output from the telephone user interface, and providing audio data, from a remote audio source, for listening by the user via the telephone.

Further in accordance with a preferred embodiment of the present invention, the transcoder employs at least one of the following protocols in providing the audio data from the audio source remote from the transcoder to the interactive voice response unit: MP3, REAL AUDIO, WINDOWS MEDIA, RTSP, RTP, HTTP, MGCP, and VoIP.

Further in accordance with a preferred embodiment of the present invention, the audio content selected by the user is delimited by a frequency range.

Still further in accordance with a preferred embodiment of the present invention, the audio content selected by the user is delimited by a temporal range.

Further in accordance with a preferred embodiment of the present invention, the telephone provides a user interface enabling the user to selectably operate on a portion of the audio content by carrying out at least one of the following operations: storage of the portion, transmittal of a link to a stored the portion via a computer network, transmittal of the portion via the computer network, playing of the portion, and manipulation of the portion.

Still further in accordance with a preferred embodiment of the present invention, the audio content is received from a PSTN audio source.

Additionally in accordance with a preferred embodiment of the present invention, the telephone provides a user interface enabling the user to select a portion of the audio content.

Further in accordance with a preferred embodiment of the present invention, the telephone provides a user interface enabling the user to selectably operate on a portion of the audio content.

Still further in accordance with a preferred embodiment of the present invention, the telephone provides a user interface enabling the user to select the portion of the audio content.

Further in accordance with a preferred embodiment of the present invention, the telephone provides a user interface enabling the user to selectably operate on the portion of the audio content.

Also provided, in accordance with another preferred embodiment of the present invention, is a system for transmission of audio content to a telephone, the system including an audio stream navigation functionality operable by using a telephone user interface and enabling a user to select audio data to be heard by the user via a telephone, an interactive voice response unit operative in response to an input from the telephone user interface operating the audio stream navigation functionality, and a transcoder operative in response to an input from the interactive voice response unit for providing audio data, from an audio source using audio streaming functionality, to the interactive voice response unit for listening by the user via the telephone.

Additionally provided, in accordance with another preferred embodiment of the present invention, is a method for transmission of audio content to a telephone, the system including providing a telephone user interface, enabling a user, using the telephone user interface, to select audio data to be heard by the user via a telephone, operating audio stream navigation functionality on a basis of an output from the telephone user interface, and providing audio data, from an audio source using audio streaming functionality, for listening by the user via the telephone.

Further in accordance with a preferred embodiment of the present invention, the audio content selected by the user is delimited by a frequency range.

Still further in accordance with a preferred embodiment of the present invention, the audio content selected by the user is delimited by a temporal range.

Additionally in accordance with a preferred embodiment of the present invention, the telephone provides a user interface enabling the user to selectably operate on a portion of the audio content by carrying out at least one of the following operations: storage of the portion, transmittal of a link to a stored the portion via a computer network, transmittal of the portion via the computer network, playing of the portion, and manipulation of the portion.

Further in accordance with a preferred embodiment of the present invention, the audio content is received from a PSTN audio source.

Still further in accordance with a preferred embodiment of the present invention, the telephone provides a user interface enabling the user to select a portion of the audio content.

Further in accordance with a preferred embodiment of the present invention, the telephone provides a user interface enabling the user to selectably operate on a portion of the audio content.

Additionally in accordance with a preferred embodiment of the present invention, the telephone provides a user interface enabling the user to select the portion of the audio content.

Still further in accordance with a preferred embodiment of the present invention, the telephone provides a user interface enabling the user to selectably operate on the portion of the audio content.

Further in accordance with a preferred embodiment of the present invention, the transcoder employs at least one of the following protocols in providing the audio data from the audio source remote from the transcoder to the interactive voice response unit: MP3, REAL AUDIO, WINDOWS MEDIA, RTSP, RTP, HTTP, MGCP, and VoIP.

Also provided, in accordance with still another preferred embodiment of the present invention, is a system for transmission of audio content to a telephone including an audio content transmitter receiving audio content from a source of audio content, the audio content transmitter being operative for transmitting to a telephone a portion of the audio content, and at least one telephone being operative to enable a user to select the portion of the audio content via the telephone and to receive the portion of the audio content to provide an audio output.

Further provided, in accordance with still another preferred embodiment of the present invention, is a method for transmission of audio content to a telephone including receiving audio content from a source of audio content, including transmitting to a telephone a portion of the audio content, and enabling a user to select the portion of the audio content via the telephone and to receive the portion of the audio content to provide an audio output.

Further in accordance with a preferred embodiment of the present invention, the at least one telephone is operative to enable the user to select the portion of the audio content by a speech input.

Still further in accordance with a preferred embodiment of the present invention, the system also includes an IVR which is in communication with the at least one telephone and with the at least one audio content transmitter and which is operative to enable the user to select a portion of the audio content by a speech input via the telephone.

Further in accordance with a preferred embodiment of the present invention, the portion of the audio content is delimited by a frequency range.

Still further in accordance with a preferred embodiment of the present invention, the portion of the audio content is delimited by a temporal range.

Further in accordance with a preferred embodiment of the present invention, the telephone provides a user interface enabling the user to selectably operate on the portion of the audio content by carrying out at least one of the following operations: storage of the portion, transmittal of a link to a stored the portion via a computer network, transmittal of the portion via the computer network, playing of the portion, and manipulation of the portion.

Further in accordance with a preferred embodiment of the present invention, the audio content is received from a PSTN audio source.

Still further in accordance with a preferred embodiment of the present invention, the telephone provides a user interface enabling the user to select a portion of the audio content.

Additionally in accordance with a preferred embodiment of the present invention, the telephone provides a user interface enabling the user to selectably operate on a portion of the audio content.

Further in accordance with a preferred embodiment of the present invention, the system employs at least one of the following protocols in providing the audio content from the audio source remote from the transcoder to the interactive voice response unit: MP3, REAL AUDIO, WINDOWS MEDIA, RTSP, RTP, HTTP, MGCP, and VoIP.

Also provided, in accordance with another preferred embodiment of the present invention, is a system for transmission of audio content to a telephone including an audio content transmitter receiving audio content from a source of audio content, the audio content transmitter being operative for transmitting to a mobile communicator a portion of the audio content, and at least one mobile communicator being operative to enable a user to select the portion of the audio content via the mobile communicator and to receive the portion of the audio content to provide an audio output.

Still further provided, in accordance with another preferred embodiment of the present invention, is a method for transmission of audio content to a telephone including receiving audio content from a source of audio content, including transmitting to a mobile communicator a portion of the audio content, and enabling a user to select the portion of the audio content via a mobile communicator and to receive the portion of the audio content to provide an audio output.

Further in accordance with a preferred embodiment of the present invention, at least one mobile communicator is operative to enable the user to select the portion of the audio content by a speech input.

Still further in accordance with a preferred embodiment of the present invention, the system also includes an IVR which is in communication with the at least one mobile communicator and with the at least one audio content transmitter and which is operative to enable the user to select a portion of the audio content by a speech input via the mobile communicator.

Further in accordance with a preferred embodiment of the present invention, the mobile communicator includes a modem equipped personal digital assistant.

Still further in accordance with a preferred embodiment of the present invention, the portion of the audio content is delimited by a frequency range.

Further in accordance with a preferred embodiment of the present invention, the portion of the audio content is delimited by a temporal range.

Further in accordance with a preferred embodiment of the present invention, the mobile communicator provides a user interface enabling the user to selectably operate on the portion of the audio content by carrying out at least one of the following operations: storage of the portion, transmittal of a link to a stored the portion via a computer network, transmittal of the portion via the computer network, playing of the portion, and manipulation of the portion.

Further in accordance with a preferred embodiment of the present invention, the audio content is received from a PSTN audio source.

Still further in accordance with a preferred embodiment of the present invention, the mobile communicator provides a user interface enabling the user to select a portion of the audio content.

Further in accordance with a preferred embodiment of the present invention, the system employs at least one of the following protocols in providing the audio content from the audio source remote from the transcoder to the interactive voice response unit: MP3, REAL AUDIO, WINDOWS MEDIA, RTSP, RTP, HTTP, MGCP, and VoIP.

Also provided, in accordance with another preferred embodiment of the present invention, is a system for transmission of audio content to a telephone including a web server operative to enable a user to select a portion of audio content, an audio content transmitter receiving audio content from a source of audio content, the audio content transmitter being operative for transmitting to a telephone a user selected portion of the audio content, and at least one telephone being operative to receive the portion of the audio content to provide an audio output.

Additionally provided, in accordance with yet another preferred embodiment of the present invention, is a method for transmission of audio content to a telephone including providing a web server, enabling a user, using the web server, to select a portion of audio content, receiving audio content from a source of audio content and transmitting to a telephone a user selected portion of the audio content, and receiving the portion of the audio content to provide an audio output.

Further in accordance with a preferred embodiment of the present invention, the at least one telephone is operative to enable the user to select the portion of the audio content by a speech input.

Still further in accordance with a preferred embodiment of the present invention, the system also includes an IVR which is in communication with the at least one telephone and with the at least one audio content transmitter and which is operative to enable the user to select a portion of the audio content by a speech input via the telephone.

Further in accordance with a preferred embodiment of the present invention, the portion of the audio content is delimited by a frequency range.

Still further in accordance with a preferred embodiment of the present invention, the portion of the audio content is delimited by a temporal range.

Further in accordance with a preferred embodiment of the present invention, the telephone provides a user interface enabling the user to selectably operate on the portion of the audio content by carrying out at least one of the following operations: storage of the portion, transmittal of a link to a stored the portion via a computer network, transmittal of the portion via the computer network, playing of the portion, and manipulation of the portion.

Further in accordance with a preferred embodiment of the present invention, the audio content is received from a PSTN audio source.

Still further in accordance with a preferred embodiment of the present invention, the telephone provides a user interface enabling the user to select a portion of the audio content.

Additionally in accordance with a preferred embodiment of the present invention, the telephone provides a user interface enabling the user to selectably operate on a portion of the audio content.

Still further in accordance with a preferred embodiment of the present invention, the system employs at least one of the following protocols in providing the audio data from the audio source remote from the transcoder to the interactive voice response unit: MP3, REAL AUDIO, WINDOWS MEDIA, RTSP, RTP, HTTP, MGCP, and VoIP.

Also provided, in accordance with another preferred embodiment of the present invention, is a system for transmission of audio content to a mobile communicator including a web server operative to enable a user to select a portion of audio content, an audio content transmitter receiving audio content from a source of audio content, the audio content transmitter being operative for transmitting to a mobile communicator a user selected portion of the audio content, and at least one mobile communicator operative to receive the portion of the audio content and to provide an audio output.

Further provided, in accordance with another preferred embodiment of the present invention, is a method for transmission of audio content to a mobile communicator including providing a web server, using the web server, enabling a user to select a portion of audio content, and receiving audio content from a source of audio content and transmitting to a mobile communicator a user selected portion of the audio content, and using at least one mobile communicator to receive the portion of the audio content and to provide an audio output.

Still further in accordance with a preferred embodiment of the present invention, the at least one mobile communicator is operative to enable the user to select the portion of the audio content by a speech input.

Further in accordance with a preferred embodiment of the present invention, the system also includes an IVR which is in communication with the at least one mobile communicator and with the at least one audio content transmitter and which is operative to enable the user to select a portion of the audio content by a speech input via the mobile communicator.

Further in accordance with a preferred embodiment of the present invention, the mobile communicator includes a modem equipped personal digital assistant.

Still further in accordance with a preferred embodiment of the present invention, the portion of the audio content is delimited by a frequency range.

Further in accordance with a preferred embodiment of the present invention, the portion of the audio content is delimited by a temporal range.

Still further in accordance with a preferred embodiment of the present invention, the mobile communicator provides a user interface enabling the user to selectably operate on the portion of the audio content by carrying out at least one of the following operations: storage of the portion, transmittal of a link to a stored the portion via a computer network, transmittal of the portion via the computer network, playing of the portion, and manipulation of the portion.

Further in accordance with a preferred embodiment of the present invention, the portion of the audio content is delimited by a frequency range.

Still further in accordance with a preferred embodiment of the present invention, the portion of the audio content is delimited by a temporal range.

Still further in accordance with a preferred embodiment of the present invention, the system employs at least one of the following protocols in providing the audio content from the audio source remote from the transcoder to the interactive voice response unit: MP3, REAL AUDIO, WINDOWS MEDIA, RTSP, RTP, HTTP, MGCP, and VoIP.

Also provided, in accordance with another preferred embodiment of the present invention, is a system for adaptive transmission of audio content to a telephone including: an audio content transmitter receiving audio content at a first bandwidth from a source of audio content and having a first amount of computing capability, the audio content transmitter being operative for transmitting to a telephone a portion of the audio content at a second bandwidth, which is less than the first bandwidth, the portion of the audio content being adaptively selected based on at least one characteristic of the received audio content, and at least one telephone having a second amount of computing capability, which need not exceed zero but which is less than the first amount of computing capability, the at least one telephone being operative to receive the portion of the audio content at the second bandwidth and to provide an audio output.

Also provided, in accordance with another preferred embodiment of the present invention, is a method for adaptive transmission of audio content to a telephone including receiving audio content at a first bandwidth from a source of audio content and having a first amount of computing capability, and transmitting to a telephone a portion of the audio content at a second bandwidth, which is less than the first bandwidth, the portion of the audio content being adaptively selected based on at least one characteristic of the received audio content, providing at least one telephone having a second amount of computing capability, which need not exceed zero but which is less than the first amount of computing capability, and using the telephone, receiving the portion of the audio content at the second bandwidth and providing an audio output.

Further in accordance with a preferred embodiment of the present invention, the audio output has a quality level which is substantially higher than the quality level that could be obtained were the audio content to be received directly from the source of audio content at the second bandwidth.

Still further in accordance with a preferred embodiment of the present invention, the source of audio content is a PSTN audio source.

Further in accordance with a preferred embodiment of the present invention, the portion of the audio content is delimited by a frequency range.

Still further in accordance with a preferred embodiment of the present invention, the portion of the audio content is delimited by a temporal range.

Still further in accordance with a preferred embodiment of the present invention, the telephone provides a user interface enabling the user to selectably operate on the portion of the audio content by carrying out at least one of the following operations: storage of the portion, transmittal of a link to a stored the portion via a computer network, transmittal of the portion via the computer network, playing of the portion, and manipulation of the portion.

Additionally in accordance with a preferred embodiment of the present invention, the system employs at least one of the following protocols in providing the audio data from the audio source remote from the transcoder to the interactive voice response unit: MP3, REAL AUDIO, WINDOWS MEDIA, RTSP, RTP, HTTP, MGCP, and VoIP.

Further in accordance with a preferred embodiment of the present invention, the audio content is received from a PSTN audio source.

Still further in accordance with a preferred embodiment of the present invention, the telephone provides a user interface enabling the user to select a portion of the audio content.

Additionally in accordance with a preferred embodiment of the present invention, the telephone provides a user interface enabling the user to selectably operate on a portion of the audio content.

Also provided, in accordance with yet another preferred embodiment of the present invention, is a system for transmission of audio content from a computer network to a telephone including an audio content transmitter receiving streaming audio content from the computer network, the audio content transmitter being operative for transmitting to a telephone at least a portion of the streaming audio content, and at least one telephone being operative to receive the portion of the audio content and to provide an audio output.

Also provided, in accordance with another preferred embodiment of the present invention, is a method for transmission of audio content from a computer network to a telephone including receiving streaming audio content from the computer network and transmitting to a telephone at least a portion of the streaming audio content, and providing at least one telephone being operative to receive the portion of the audio content and to provide an audio output.

Still further in accordance with a preferred embodiment of the present invention, the portion of the audio content is delimited by a frequency range.

Further in accordance with a preferred embodiment of the present invention, the portion of the audio content is delimited by a temporal range.

Still further in accordance with a preferred embodiment of the present invention, the telephone provides a user interface enabling the user to selectably operate on the portion of the audio content by carrying out at least one of the following operations: storage of the portion, transmittal of a link to a stored the portion via a computer network, transmittal of the portion via the computer network, playing of the portion, and manipulation of the portion.

Further in accordance with a preferred embodiment of the present invention, the telephone provides a user interface enabling the user to select a portion of the audio content.

Still further in accordance with a preferred embodiment of the present invention, the telephone provides a user interface enabling the user to selectably operate on a portion of the audio content.

Additionally in accordance with a preferred embodiment of the present invention, the telephone provides a user interface enabling the user to select the portion of the audio content.

Further in accordance with a preferred embodiment of the present invention, the transcoder employs at least one of the following protocols in providing the audio data from the audio source remote from the transcoder to the interactive voice response unit: MP3, REAL AUDIO, WINDOWS MEDIA, RTSP, RTP, HTTP, MGCP, and VoIP.

Also provided, in accordance with another preferred embodiment of the present invention, is a system for transmission of audio content from a computer network to a telephone including an audio content transmitter receiving audio content from the computer network at a first bandwidth and having a first amount of computing capability, the audio content transmitter being operative for transmitting to a telephone a portion of the audio content at a second bandwidth, which is less than the first bandwidth, the portion of the audio content being adaptively selected based on at least one characteristic of the received audio content, and at least one telephone having a second amount of computing capability, which need not exceed zero but which is less than the first amount of computing capability, the at least one telephone being operative to receive the portion of the audio content at the second bandwidth and to provide an audio output.

Further provided, in accordance with another preferred embodiment of the present invention, is a method for transmission of audio content from a computer network to a telephone including receiving audio content from the computer network at a first bandwidth and having a first amount of computing capability, including transmitting to a telephone a portion of the audio content at a second bandwidth, which is less than the first bandwidth, the portion of the audio content being adaptively selected based on at least one characteristic of the received audio content, and providing at least one telephone having a second amount of computing capability, which need not exceed zero but which is less than the first amount of computing capability, the at least one telephone being operative to receive the portion of the audio content at the second bandwidth and to provide an audio output.

Further in accordance with a preferred embodiment of the present invention, the portion of the audio content is delimited by a frequency range.

Still further in accordance with a preferred embodiment of the present invention, the portion of the audio content is delimited by a temporal range.

Further in accordance with a preferred embodiment of the present invention, the telephone provides a user interface enabling the user to select the portion of the audio content.

Still further in accordance with a preferred embodiment of the present invention, the telephone provides a user interface enabling the user to selectably operate on the portion of the audio content.

Further in accordance with a preferred embodiment of the present invention, the telephone provides a user interface enabling the user to selectably operate on the portion of the audio content by carrying out at least one of the following operations: storage of the portion, transmittal of a link to a stored the portion via a computer network, transmittal of the portion via the computer network, playing of the portion, and manipulation of the portion.

Additionally in accordance with a preferred embodiment of the present invention, the telephone provides a user interface enabling the user to selectably operate on a portion of the audio content.

Further in accordance with a preferred embodiment of the present invention, the telephone provides a user interface enabling the user to select the portion of the audio content.

Still further in accordance with a preferred embodiment of the present invention, the transcoder employs at least one of the following protocols in providing the audio data from the audio source remote from the transcoder to the interactive voice response unit: MP3, REAL AUDIO, WINDOWS MEDIA, RTSP, RTP, HTTP, MGCP, and VoIP.

Further in accordance with a preferred embodiment of the present invention, the source of audio content is a PSTN audio source.

It is appreciated throughout the specification and claims that the term "semaphoring" refers to indicating a place mark within an audio content stream for the purposes of selectively accessing specific portions of the audio content, and that the term "semaphore" refers to the place mark itself.

The disclosures of all patents, patent applications, and other publications mentioned in this specification, and of the patents, patent applications, and other publications cited therein, are hereby incorporated by reference.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1:
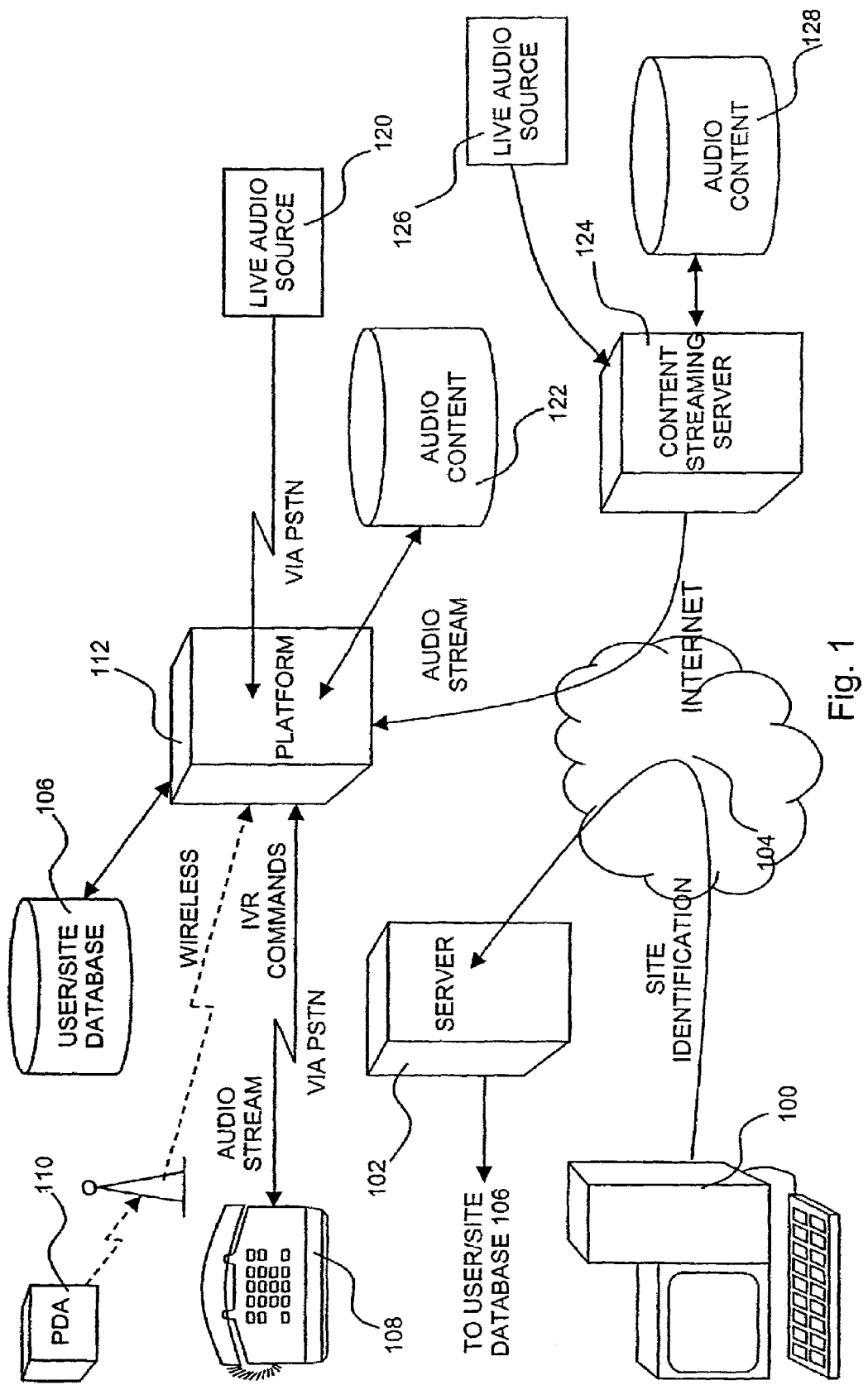
FIG. 1 is a simplified conceptual illustration of a system for telephone and wireless access to computer network-based streaming audio, constructed and operative in accordance with a preferred embodiment of the present invention.

Reference is now made to FIG. 1, which is a simplified conceptual illustration of a system for telephone and wireless access to computer network-based streaming audio, constructed and operative in accordance with a preferred embodiment of the present invention. In the system of FIG. 1, a client 100 is shown communicating with a server 102 via a computer network 104, such as the Internet, in a conventional manner. The client 100 is preferably configured with a "browser" or other conventional communications software to allow a user to either input the location of audio content on the computer network 104, typically expressed as a Uniform Resource Locator (URL), and communicate the location to the server 102, or to select from among predefined audio content whose locations are accessed via the server 102 and presented to the client 100 for selection.

Audio content selections, typically expressed as network locations, are preferably maintained, at the server 102, in a user database 106 along with a user identification preconfigured with the server 102 using any known user registration technique. The user identification may be provided as part of the audio content identification session.

A telephone 108, such as a conventional wired telephone and/or a wireless communicator 110, such as a telephone or a suitably configured PDA, is shown in communication with an audio transcoding communications platform 112, such as via a Public Switched Telephone Network (PSTN) connection or a cellular telephone network connection respectively. The telephone 108 may be a standard, mechanical telephone having no computing capability, or may be an electronic or electromechanical telephone having some computing capabilities, although typically less than the computing capabilities of the platform 112.

The telephone 108 and/or the wireless communicator 110 typically interfaces with the platform 112 using voice and/or a Dual Tone Multi Frequency (DTMF) input. Such input typically includes a user identification, which may be expressed as a personal identification number (PIN), a speech sample for voice printing, a spoken identification and/or password, the caller's telephone number keyed in by the caller or automatically identified using caller ID techniques, or the telephone number called by the telephone 108 and/or the wireless communicator 110 as identified using DNIS (Dialed Number Identification Service) or DID (Direct Inward Dialing) techniques. DNIS is a telephone service that informs the call receiver of the number that the caller dialed. This function is used frequently with free phone lines, where a multiplicity of numbers can lead to the same destination, such as multiple 1-800 numbers. DID is a service typically provided by local phone companies) that provides "a block of telephone numbers for calling into a company's Private Branch Exchange (PBX) system. Using DID, a company can offer its customers individual phone numbers for each person or workstation within the company without requiring a physical line into the PBX for each possible connection."

(http://www.whatis.com/WhatIs Search Results Exact/1, 2820 33,,00.html?query=did)

The telephone 108 and/or the wireless communicator 110 may also be used to input the location of audio content on the network 104, typically expressed as a Uniform Resource Locator (URL), or to select from among predefined audio content the location of which is configured with the platform 112 and presented to the telephone 108 and/or wireless communicator 110 in an audio menu format for selection. Audio content selections and/or network locations are then preferably maintained in the database 106 along with the user identification.

The telephone 108 and/or the wireless communicator 110 may then be used to select audio content from among the locations previously pre-configured with and/or provided to the server 102 and/or the platform 112 and presented via the telephone 108 and/or the wireless communicator 110 as audible menu prompts. The platform 112 then accesses the selected audio content, transcodes the audio content as necessary for telephone and wireless communication, and provides the transcoded audio stream to the telephone 108 and/or the wireless communicator 110. The platform 112 may access audio content as necessary and in accordance with conventional techniques at any of the following sources:

☐1 a live audio source 120, such as a local radio station, is connected by telephone via a PSTN connection directly to the platform 112;

☐2 an audio content storage device 122, on which recorded audio content is stored, is connected directly to the platform 112;

☐3 a content streaming server 124, via the network 104, at a specified network location, which in turn may access a second live audio source 126, such as a distant radio broadcast, is connected directly to the server 124; and/or ☐4 an audio content storage device 128, on which recorded audio content may be stored, is connected directly to the server 124.

Figure 2:
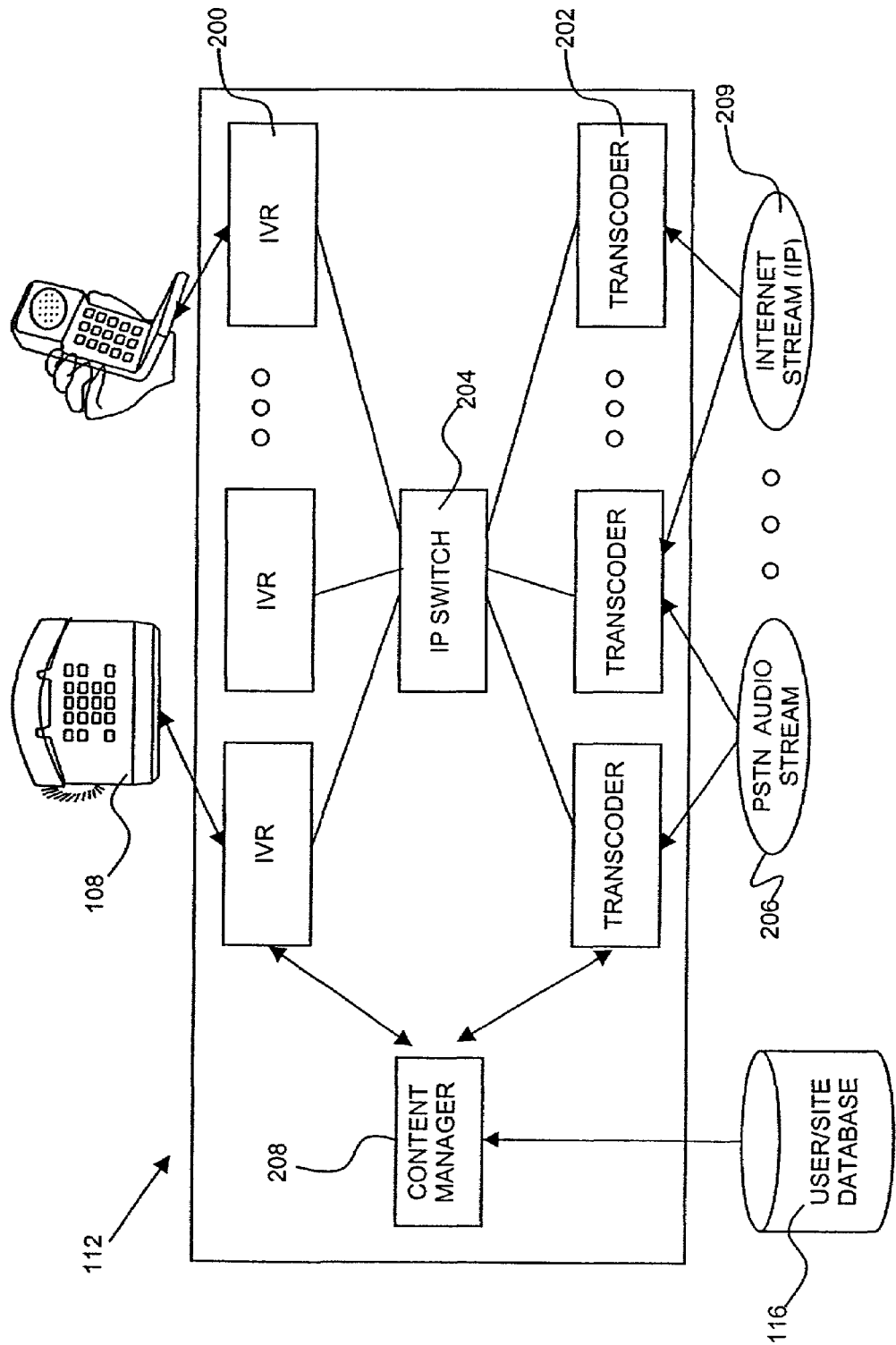
FIG. 2 is a simplified block diagram of an example of an implementation of audio transcoding communications platform 112 of FIG. 1, constructed and operative in accordance with a preferred embodiment of the present invention.

Reference is now made to FIG. 2, which is a simplified block diagram of an implementation of the audio transcoding communications platform 112 of FIG. 1, constructed and operative in accordance with a preferred embodiment of the present invention. In FIG. 2, the platform 112 is shown as having one or more conventional Interactive Voice Response (IVR) interfaces 200. Each IVR may communicate with one or more transcoders 202 via a switch 204, such as an IP switch. Each IVR interface 200 is operative to receive telephone and wireless communication from a telephone, such as the telephone 108 and/or the wireless communicator 110 of FIG. 1, or to receive voice and/or DTMF commands. In response thereto, the IVR interface 200 provides audio output.

Each transcoder 202 is operative to communicate with one or more audio content sources, such as a PSTN audio stream 206 or an Internet Stream 209 (IP) using any suitable communication format, and to receive streamed or non-streamed audio content. The transcoder 202 typically receives relatively high bandwidth audio content, such as content transmitted at 44 kHz, and converts the audio content to a form suitable for telephone and wireless output at a relatively low bandwidth, such as 8 kHz μ-law.

As input and output bandwidth varies, due to changes in available quality of service or due to other causes, transcoder 202 may adapt its sampling rates accordingly. The transcoder 202 may also adaptively select portions of the audio content input for processing into a form suitable for telephone and wireless output. These portions may be, for example, specific segments of the audio content, as described in greater detail herein below, or specific frequencies that may be selected by using standard filtering techniques. A content manager 208 may also be also provided for managing the interconnections between the IVRs 200, the transcoders 202, and the audio content sources 206 and 209.

Figure 3:
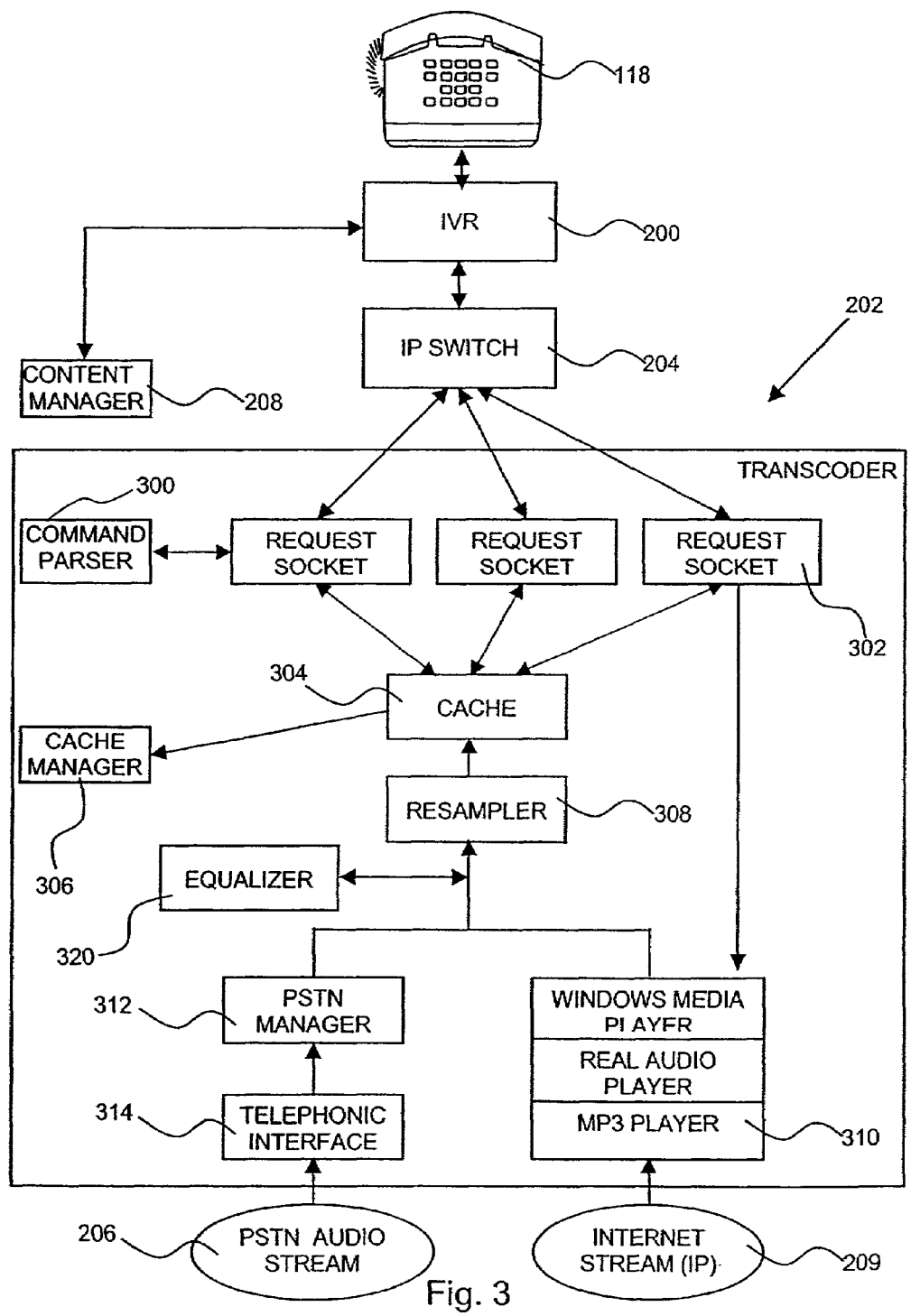
FIG. 3 is a simplified block diagram of an example of an implementation of transcoder 202 of FIG. 2, constructed and operative in accordance with a preferred embodiment of the present invention.

Reference is now made to FIG. 3, which is a simplified block diagram of an implementation of the transcoder 202 of FIG. 2, constructed and operative in accordance with a preferred embodiment of the present invention. In FIG. 3, the transcoder 202 is shown as having a command parser 300, which parses commands received by IVR 200 via one or more request sockets 302, each socket 302 being suitable for conveying an audio stream to the IVR 200 (FIG. 2) via an IP switch 204 (FIG. 2). A cache 304 is controlled by a cache manager 306 and receives an audio input from a resampler 308. The resampler 308 formats audio streams, rendering them suitable for telephone or wireless output.

One or more audio content players 310, such as a MICROSOFT® WINDOWS® MEDIA PLAYER, a REAL AUDIO® player, or an MP3-format player, play audio streams received from an Internet Stream 209 (FIG. 2) a PSTN manager 206 for managing telephone and wireless connections to sources of audio content, and one or more telephone and wireless interfaces 314, such as a DM IPLink, commercially available from Dialogic Corporation, 1515 Route Ten, Parsippany, N.J., 07654-4596, USA. The transcoder 202 may also include an equalizer 320 for adjusting the sound quality of audio content in accordance with conventional techniques, thus providing audio output that has a substantially higher quality than would otherwise be obtained were high-bandwidth audio content received directly by a low-bandwidth telephone.

Figure 4A:
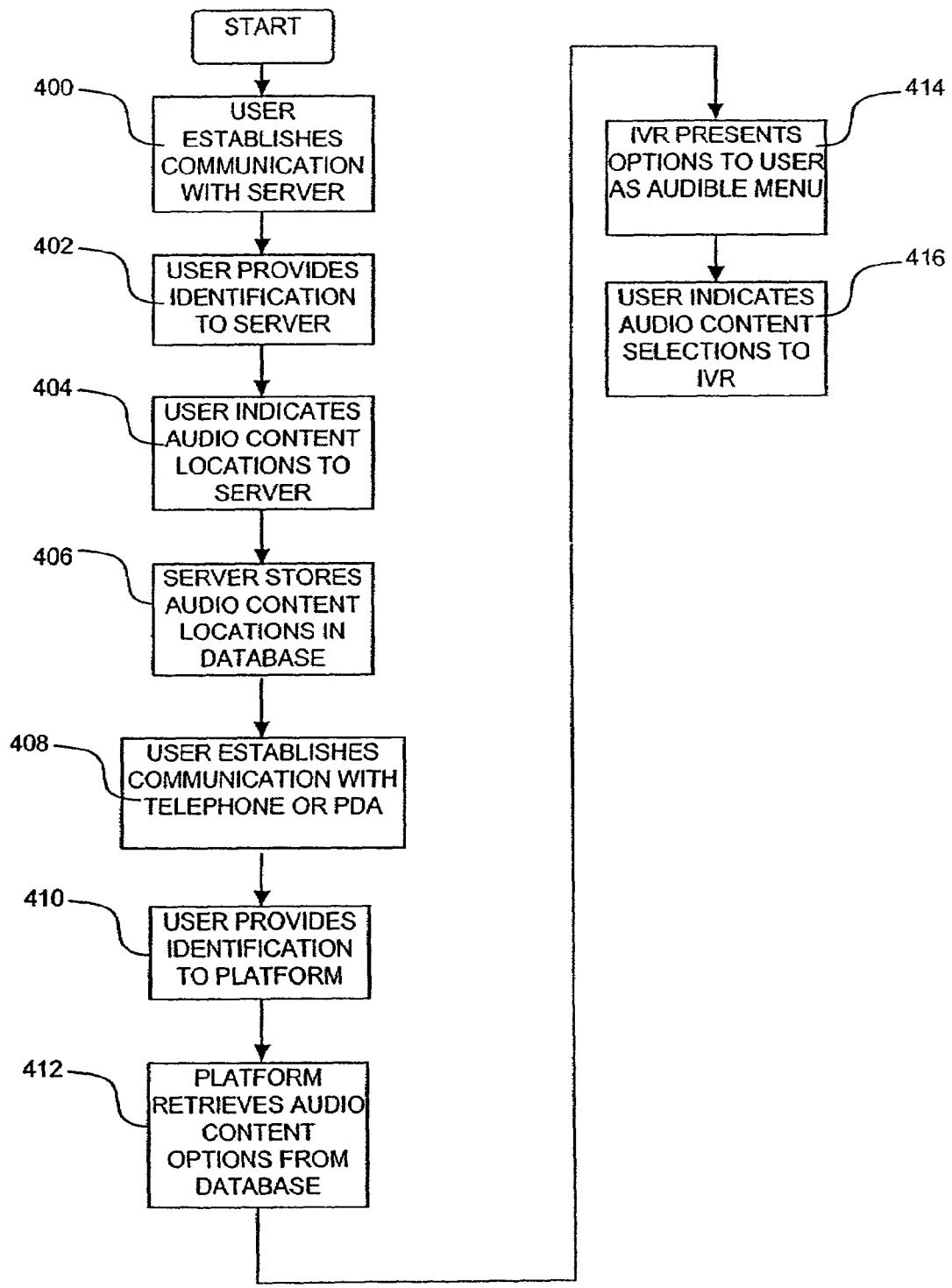
FIGS. 4A and 4B, taken together, are a simplified flowchart illustration describing an example of a method of operation of the system shown in FIGS. 1, 2, and 3.
Figure 4B:
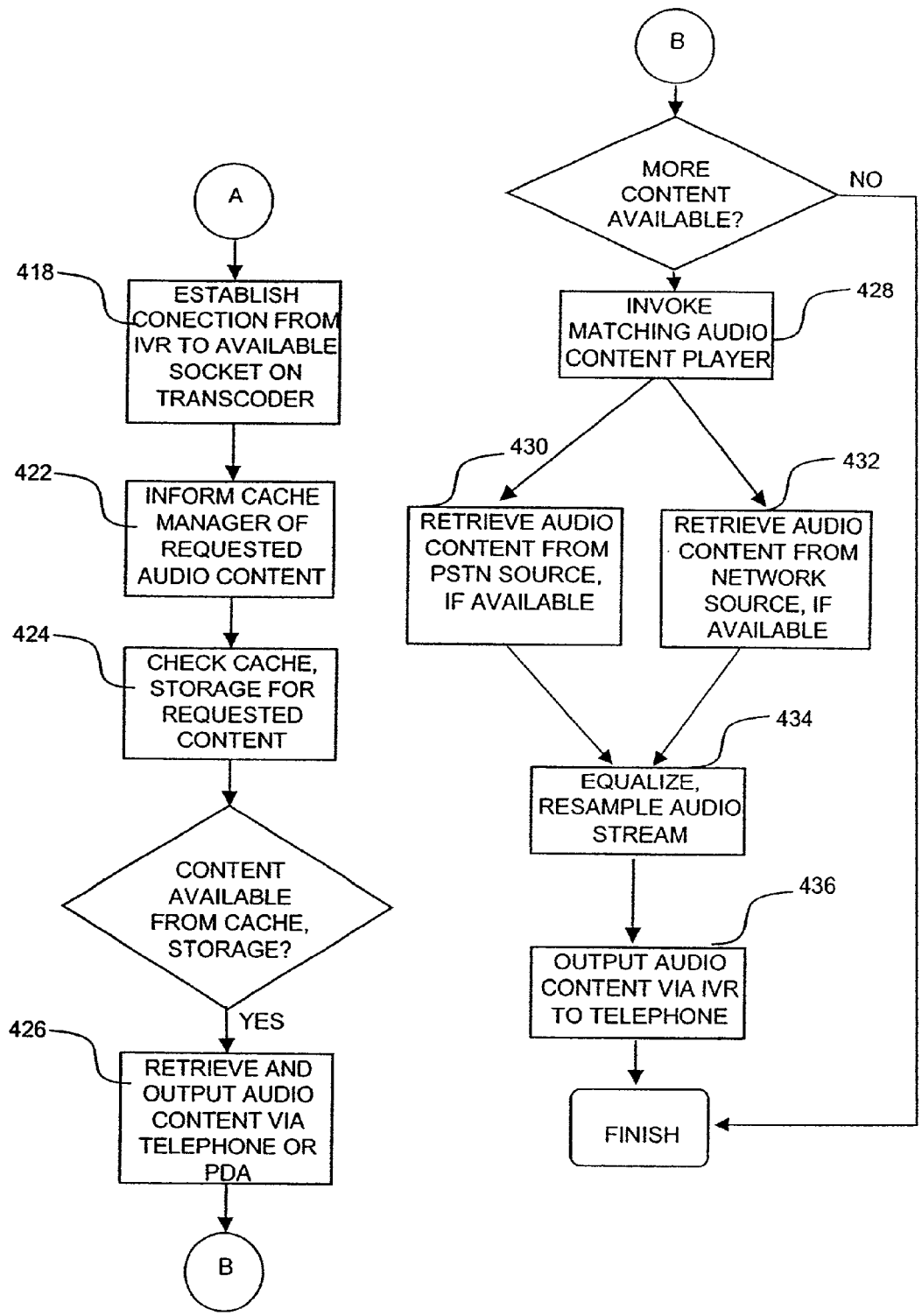

Reference is now made to FIGS. 4A and 4B which, taken together, are simplified flowchart illustrations describing a method of operation of the system of FIGS. 1, 2, and 3, in accordance with a preferred embodiment of the present invention. Referring now to FIG. 4A, a user employs the client 100 to establish a communications channel with the server 102 via the computer network 104 (step 400). The user establishes a unique identification via the server 102, or provides a previously established identification to server 102 (step 402). Next, the user communicates the location of audio content on the network 104 to the server 102 and/or selects from among predefined audio content whose locations are configured with the server 102 and presented to the client 100 for selection (step 404). The server 102 then stores the desired audio content indicated by the user in the database 106 (step 406).

It is appreciated that steps 400-406 may additionally or alternatively be carried out by the telephone 108 and/or the wireless communicator 110 in communication with the audio transcoding communications platform 112, as described hereinabove with reference to FIG. 1.

Subsequently, the user contacts the audio transcoding communications platform 112 employing the telephone 108 and/or the wireless communicator 110 and interfaces with the IVR 200 (FIG. 2) using voice and/or a Dual Tone Multi Frequency (DTMF) input (step 408). The user is prompted to enter his identification (step 410). The IVR 200 authenticates the user's identity against the database 106. The IVR 200 then requests that the content manager 208 access from the database 106 audio content selections previously provided by the user, other available audio content, or any combination (step 412). The IVR 200 then presents to the user an audible menu of the audio content, typically organized into subject categories (step 414). The user then selects the desired audio content and indicates his selection to the IVR 200 (step 416).

Referring now to FIG. 4B, once the audio content is selected, content manager 208 refers IVR 200 to a specific transcoder 202. A connection is established from the IVR 200 to an available socket on the transcoder 202. (step 418). The content manager 208 selects a specific transcoder 202 in order to maximize usage of transcoder resources. Transcoders 202 are allocated to supply access to a specific stream by the content manager 208 in a manner that preferably limits the number of connections to the outside stream. For instance, should one of the transcoders be currently connected to the BBC World Service via internet stream 236, future requests for access to information from the IVR 200 will be referred by the content manager 208 to that transcoder.

A request socket 302 informs the cache manager 308 of the requested audio content (step 422). The cache manager 308 checks the cache 304 and/or the audio content storage device 122 to see if any of the audio content has been previously cached and/or stored (step 424). Any cached or stored audio content is then retrieved and provided to the IVR 200 for output via the telephone 108 and/or the wireless communicator 110 (step 426).

If the requested audio content is unavailable from cache or storage, the request socket instructs the transcoder 202 to load content. The transcoder 202 selects the audio content player 310 that matches the format of the incoming audio stream (step 428). If the requested content originates from a PSTN source, the PSTN manager 312 connects to the desired PSTN source 206 via the telephonic interface 314 and provides the content to the IVR 200 (step 430). If the requested content originates from a live audio source 126 via the network 104, then audio content player 310 establishes a network connection with the appropriate source via network 104 (step 432).

Optionally, the audio stream may then be modified by the equalizer 320 and the resampler 308. The equalizer 320 may modify the frequencies of audio content, such as by removing high frequencies or adjusting tone and bass. The resampler 306 may change the sampling rate for instance, by converting from 44 kHz to 8 kHz. The resampler 306 preferably contains a converter (not shown), which is capable of converting audio content to 8-bit μ-law format. The audio stream, which leaves the resampler 306 and enters the cache 304, is thus modified into a format that is suitable for telephone and wireless output (step 434). The re-sampled audio stream is then provided to the IVR 200 for output via the telephone 108 and/or the wireless communicator 110 (step 436). Re-sampled content may be optionally cached and/or stored in the cache 304 and/or the storage device 122.

It is appreciated that the existence and validity of audio content may be determined, and audio content may be cached and/or stored in anticipation of serving user requests. It is also appreciated that any of steps 428 through 434 may be performed by platform 112 as sources of audio content are made known to platform 112, preferably prior to serving telephone requests for such audio content. These steps may be performed in a process separate from the method of operation of the system shown in FIGS. 4A and 4B and described hereinabove.

Figure 5:
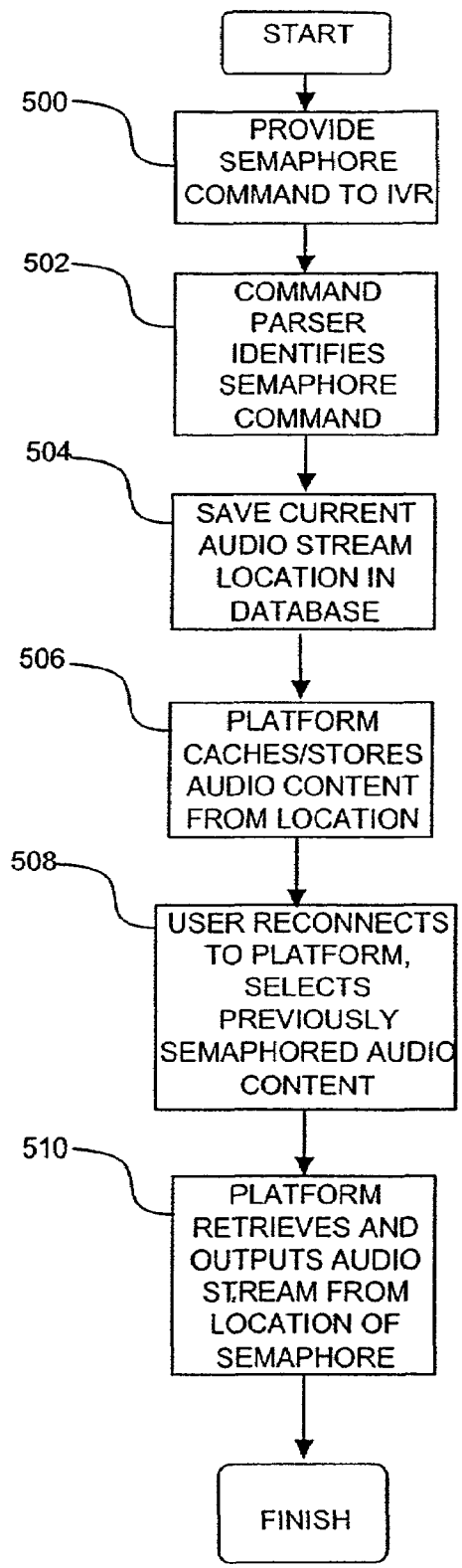
FIG. 5 is a simplified flowchart illustration describing another example of a method of operation of the system shown in FIGS. 1, 2, and 3, illustrating semaphoring audio content in accordance with a preferred embodiment of the present invention.

Reference is now made to FIG. 5, which is a simplified flowchart illustration describing a method of operation of FIGS. 1, 2, and 3 providing the functionality of semaphoring audio content, in accordance with a preferred embodiment of the present invention. In the method of FIG. 5, once the transcoder 202 begins providing audio content to the telephone 108 and/or the wireless communicator 110, the user may provide a voice and/or DTMF command to the IVR 200 to indicate the placement of a "semaphore", operable to mark a position in the audio stream (step 500). The IVR 300 then provides the command to the parser 200, which identifies the command as being a request for semaphore (step 502).

Once the command for a semaphore has been identified, the transcoder 202 instructs the IVR 200 to save the current location of the audio stream in the database 106 (step 504). The platform 112 may additionally be configured to begin caching and/or storing the audio stream from the point where the semaphore is indicated (step 506). Later, when the user reconnects by telephone to the platform 112 and selects the previously semaphored audio content (step 508), the transcoder 202 begins the audio stream from the location of the semaphore, either automatically or upon specific instruction by the user (step 510).

Alternatively, the user 100 may request the future placement of a semaphore. For instance, a user may wish to record a future BBC broadcast of 'Letter from America' scheduled to take place at 3:00am. In one scenario, the user is responsible for providing information regarding the link to be recorded, such as the URL and recording time. The user accesses the IVR, establishes a user name and password, and indicates that he would like to receive the BBC World Service broadcast of 'Letter from America'. This is accomplished by providing the associated URL and entering start & finish times for the recording. The system, as described in step 500 will, at the appropriate time, provide a semaphore command to the IVR 200.

Later, when the user wishes to hear the recording, the user places a telephone call to an IVR interface of the present invention and enters his access code and password. The user is then presented with a menu of choices, including URLs that the user previously indicated, typically presented by content category. The user then chooses a category that includes the BBC World Service broadcasts and then selects the 'Letter from America' broadcast. Responsive to this selection, the transcoder 202 of the present invention establishes a network connection with http://www.broadcast.com/bbc/, if such a connection has not earlier been established. The network server receives the news broadcast in a streaming audio format, and then renders the streaming audio to provide a telephone output. The IVR 200 then provides the command to the parser 300, which identifies the command as being a request for a semaphore (step 502). Once the command for a semaphore has been identified, the transcoder 202 instructs the IVR 200 to save the current offset of the audio stream in the database 106 (step 504).

The platform 112 may additionally be configured to begin caching and/or storing the audio stream from the location where the semaphore is indicated (step 506). Later, when the user reconnects by telephone to the platform 112 and selects the previously semaphored audio content (step 508), the transcoder 202 begins the audio stream from the point of the semaphore, either automatically or upon specific instruction from the user (step 510).

In an alternative scenario, the system provides the details and the user selects his choices from a menu of pre-configured presentations. The user places a telephone call to an IVR interface of the present invention and enters his user name and password. The user is presented with a main menu and list of options such as "press 1 for news, press 2 for business". The user typically selects 1 for news and is presented with an additional list of options. Within the list is the option to "press 3 to record a program". The user is given a list of choices of stations to from which to record, such as BBC, CNN or CBS.

The user typically selects the BBC World Service and is presented with a list of programs that are broadcast on the BBC World Service. The user typically selects the program 'Letter from America'. The information is stored in a database (not shown) which stores all program data such as URLs and broadcast times.

Later, when the user wishes to hear the recording, the user places a telephone call to an IVR interface of the present invention and enters his user name and password. The user is typically presented with a main menu and list of options such as "press 1 for news, press 2 for business". The user typically selects 1 for news and is presented with an additional list of options. Within the list is the option "press 4 for a pre-recorded program". The user typically selects the appropriate pre-recorded program. Responsive to this selection, the transcoder 202 of the present invention establishes a network connection with http://www.broadcast.com/bbc/, if such a connection has not earlier been established. The network server receives the news broadcast in a streaming audio format, and then renders the streaming audio to provide a telephone output.

The IVR 200 then provides a semaphore command to the parser 300, which identifies the command as being a request for semaphore (step 502). Once the command for a semaphore has been identified, the transcoder 202 instructs the IVR 200 to save the current location of the audio stream in the database 116 (step 504). The platform 112 may additionally be configured to begin caching and/or storing the audio stream from the location where the semaphore is indicated (step 506). Later, when the user reconnects by telephone to the platform 112 and selects the previously semaphored audio content (step 508), the transcoder 202 begins the audio stream from the point of the semaphore, either automatically or upon specific instruction from the user (step 510).

Figure 6:
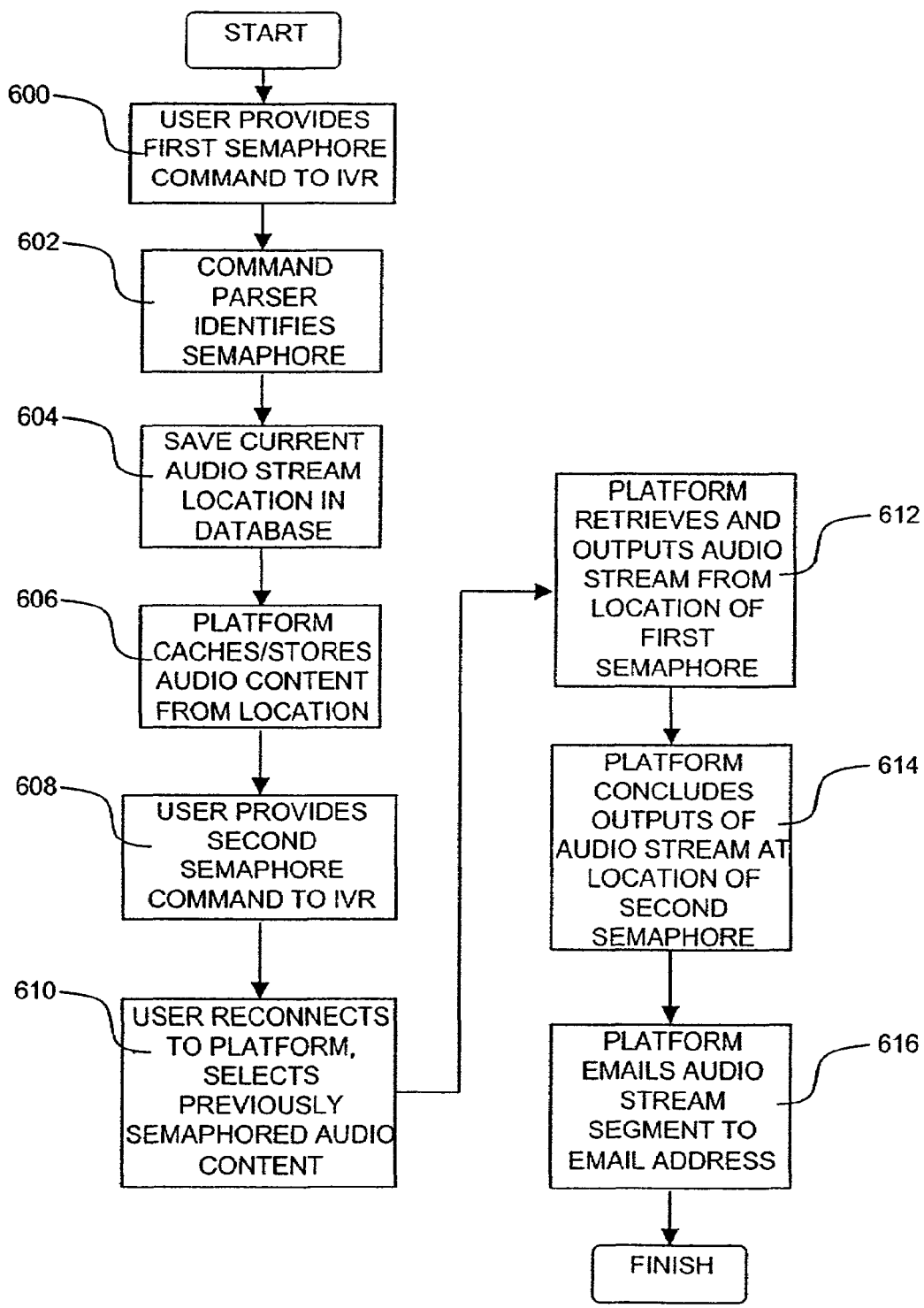
FIG. 6 is a simplified flowchart illustration describing another example of a method of operation of the system shown in FIGS. 1, 2, and 3, illustrating semaphoring and transmission of audio content in accordance with a preferred embodiment of the present invention.

Reference is now made to FIG. 6, which is a simplified flowchart illustration describing a method of operation of the embodiment of FIGS. 1, 2, and 3 which provides semaphoring audio content, in accordance with a preferred embodiment of the present invention. In the method of FIG. 6, once the transcoder 202 begins providing audio content to the telephone 108 and/or the wireless communicator 110, the user may provide a voice and/or DTMF command to the IVR 200 to indicate the placement of a "semaphore" (step 600). The IVR 200 then provides the semaphore command to the parser 300, which identifies the command as being a request for semaphore (step 602).

Once the command for a semaphore has been identified, the transcoder 202 instructs the IVR 200 to save the current location of the audio stream in the database 116 (step 604). The platform 112 may additionally be configured to begin caching and/or storing the audio stream from the point where the semaphore is indicated (step 606). The user may then provide a second semaphore command to the IVR 200 to indicate the end of the portion within the audio stream that the user wishes to mark (step 608).

The portion marked by the user or a hypertext link thereto may be sent via electronic mail to an electronic mail address provided by the user to the platform 112 for later retrieval at the client 100 or other computer in a non-telephone and wireless format, such as in the WAV audio file format (step 616).

Figure 7:
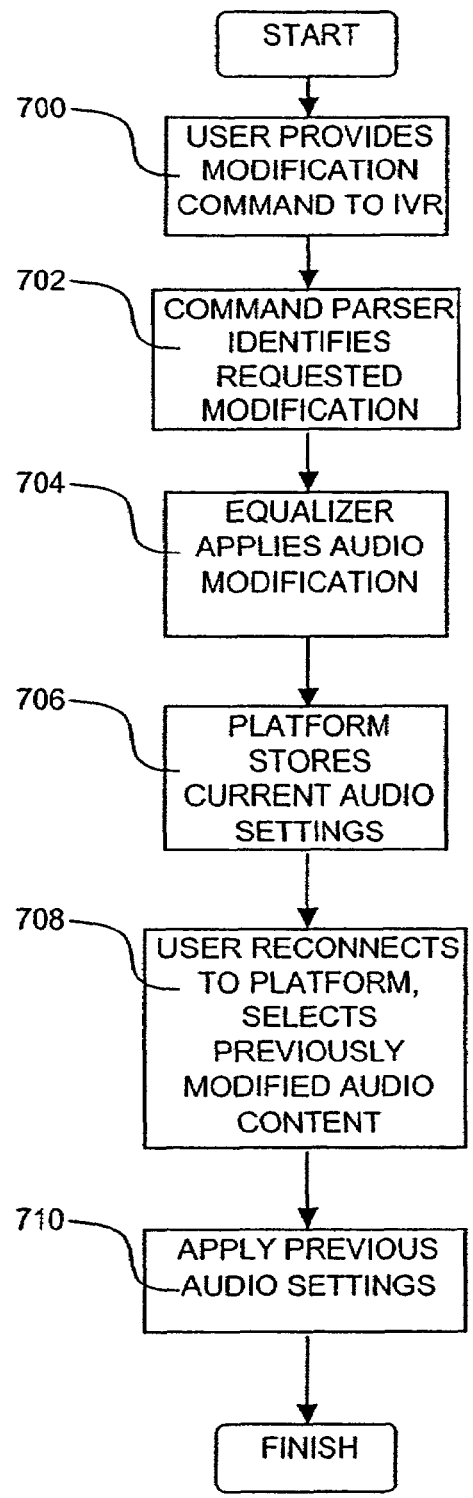
FIG. 7 is a simplified flowchart illustration describing an example of a method of operation of the system shown in FIGS. 1, 2, and 3, illustrating modifying audio content in accordance with a preferred embodiment of the present invention.

Reference is now made to FIG. 7, which is a simplified flowchart illustration describing a method of operation of the embodiment of FIGS. 1, 2, and 3 providing functionality for modifying audio content, in accordance with a preferred embodiment of the present invention. In the method of FIG. 7, once the transcoder 202 begins providing audio content to the telephone 108 and/or the wireless communicator 110, the user may provide a voice and/or DTMF command to the IVR 200 to indicate that one or more characteristics of the audio stream be modified (step 700). Such characteristics may include, for example, volume and filtering characteristics such as base and treble.

The IVR 200 then provides a modification command to the parser 300, which identifies the specific modification command (step 702). Once the modification command has been identified, the transcoder 202 instructs the equalizer 320 to adjust the audio stream accordingly (step 704). The transcoder 202 may also instruct the IVR 200 to save the current audio settings in the database 106 (step 706). Later, when the user reconnects by telephone to platform 112 and selects the previously modified audio content (step 708), the equalizer 320 may adjust the audio stream based on the saved settings, either automatically or upon specific instruction from the user (step 710).

Figure 8:
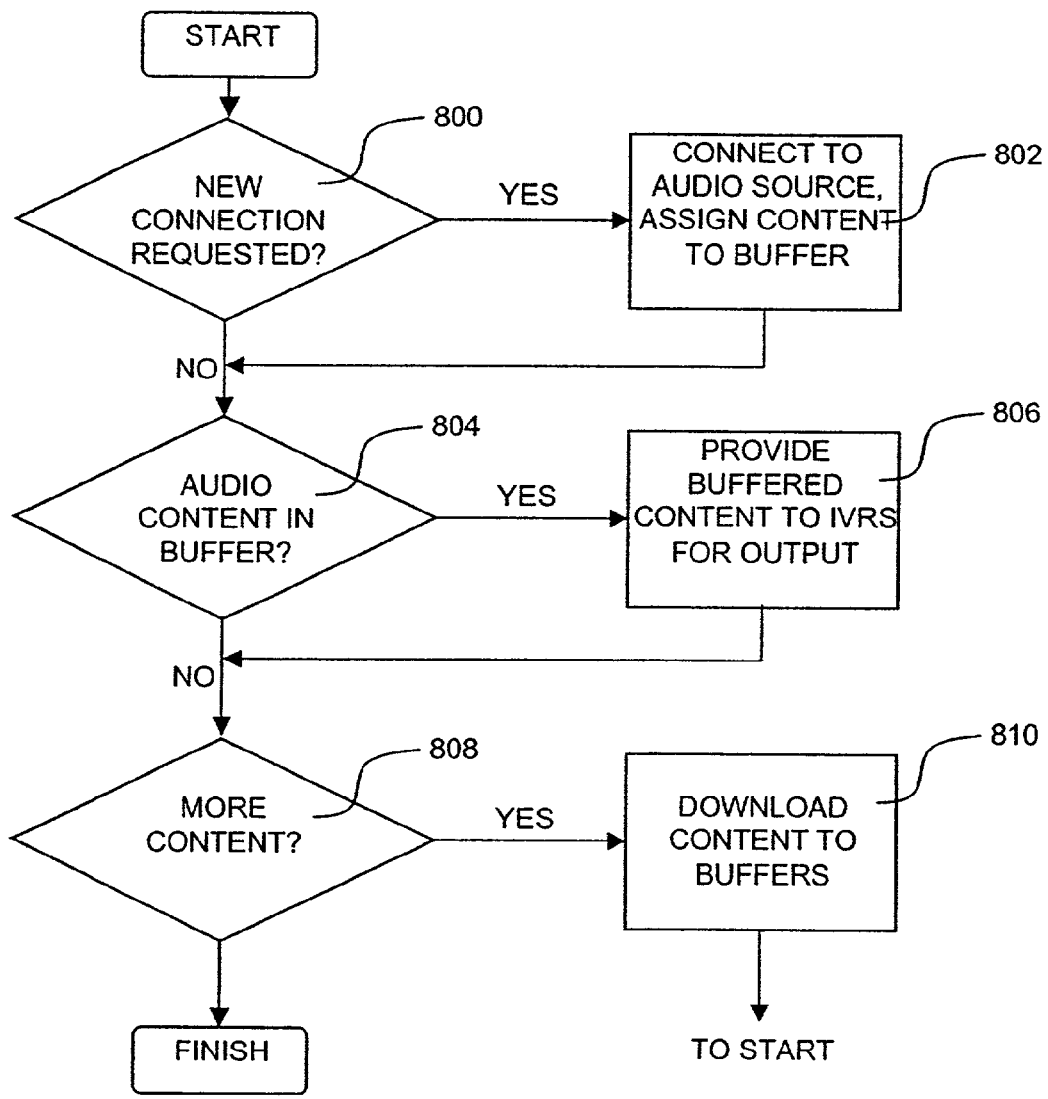
FIG. 8 is a simplified flowchart illustration describing an example of a method of operation of the system shown in FIGS. 1, 2, and 3, illustrating transcoder time-slicing, operative in accordance with a preferred embodiment of the present invention.

Reference is now made to FIG. 8, which is a simplified flowchart illustration describing a method of operation of the embodiment of FIGS. 1, 2, and 3 which provides functionality for transcoder time-slicing, in accordance with a preferred embodiment of the present invention. In the method of FIG. 8, the transcoder 202 may be configured to support multiple audio streams concurrently in a single processing thread using a time-slicing loop. At the beginning of the loop, a time-slice is provided to allow the transcoder to accept requests from the IVR 200 (step 808). If a request is received from the IVR, a connection is established with an audio source, a buffer is assigned to a player and the downloading of audio content from the audio source, e.g., PSTN or IP, to the buffer is initiated (step 802).

Subsequent to processing a request, a time-slice is provided for processing. During the processing time, the transcoder 202 checks whether there is downloaded audio content in any of the buffers (step 804) and, if so, the audio content is provided to the various IVRs for telephone output (step 806). During this time-slice, a check is made to verify whether audio content needs to be downloaded to the various buffers (step 810).

It is appreciated that those skilled in the art may incorporate any of the functions of the platform 112 or the transcoder 202 as described hereinabove into the telephone 108 and/or the wireless communicator 110, with the telephone 108 and/or the wireless communicator 110 working in cooperation with any functions remaining in the platform 112 or the transcoder 202.

It is appreciated that one or more of the steps of any of the methods described herein may be omitted or carried out in a different order than that shown, without departing from the true spirit and scope of the invention.

While the present invention as disclosed herein may or may not have been described with reference to specific hardware or software, the present invention has been described in a manner sufficient to enable persons of ordinary skill in the art to readily adapt commercially available hardware and software as may be needed to reduce any of the embodiments of the present invention to practice without undue experimentation and using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A system for transmission of audio content to a telephone, the system comprising:
   an audio stream navigation functionality operable by using a telephone user interface and enabling a user to select audio data to be heard by the user via said telephone;
   an interactive voice response unit operative in response to an input from said telephone user interface operating said audio stream navigation functionality;
   a transcoder operative in response to an input from said interactive voice response unit for providing audio data to the user via said telephone, the audio data transmitted from an audio source remote from said transcoder, to said interactive voice response unit in communication with said telephone for listening by said user via said telephone;
   a content manager, the transcoder and the interactive voice response (IVR) unit responsive to the content manager for directing the audio stream; and
   a cache, the cache responsive to the content manager for selectively receiving and rendering the directed audio stream, the telephone providing the user interface enabling said user to select a portion of the audio content, the system further operable to:
      receive a set of available preconfigured locations having the audio content;
      select a location of the portion from among the preconfigured locations; and
      assign an IVR interface coupled to the transcoder for receiving the portion from the selected location, the IVR interface assigned by a content manager operable to assign a plurality of IVR interfaces; and
      receive the portion via the assigned IVR interface.

2. A system according to claim 1 and wherein said transcoder employs at least one of the following protocols in providing said audio data from said audio source remote from said transcoder to said interactive voice response unit:

MP3;
REAL AUDIO;
WINDOWS MEDIA;
RTSP;
RTP;
HTTP;
MGCP; and
VoIP.

3. A system according to claim 1 and wherein said audio content selected by said user is delimited by a frequency range.

4. A system according to claim 1 and wherein said audio content selected by said user is delimited by a temporal range.

5. A system according to claim 1 and wherein said telephone provides said user interface enabling said user to selectably operate on a portion of said audio content by carrying out at least one of the following operations:
   identification of the portion by at least one semaphore indicative of the portion within an audio stream transporting the audio content;
   storage of said portion;
   transmittal of a link to a stored said portion via a computer network;
   transmittal of said portion via said computer network;
   playing of said portion; and
   manipulation of said portion.

6. A system according to claim 5 wherein said audio content is received from said PSTN audio source.

7. A system according to claim 1 and wherein said telephone provides said user interface enabling said user to selectably operate on a portion of said audio content by:
   receiving a semaphore command indicative of the portion, the semaphore based on an offset into the audio stream;
   identifying the portion by delimiting the portion with a semaphore, the semaphore delimited portion operable for selective storage, recall and rendering from the user interface.

8. A system according to claim 5 and wherein said telephone provides said user interface enabling said user to select said portion of said audio content, the user interface further operable for:
   identifying the portion within an audio stream transporting said audio content by saving the current location within the audio stream;
   storing the identified portion in a cache operable for selective recall by the user via a location identifier;
   recalling the stored portion from the saved current location responsively to input from the user interface; and
   rendering the recalled portion to the user.

9. A system according to claim 5 and wherein said telephone provides said user interface enabling said user to selectably operate on said portion of said audio content by selecting a semaphore delimited portion of the audio stream, the semaphore delimited portion designated by an offset into the audio stream.

10. A system for transmission of audio content to a telephone, the system comprising:
    an audio stream navigation functionality operable by using a telephone user interface and enabling a user to select audio data to be heard by the user via said telephone;
    an interactive voice response unit operative in response to an input from said telephone user interface operating said audio stream navigation functionality; and
    a transcoder operative in response to an input from said interactive voice response unit for providing audio data to the user via said telephone, the audio data transmitted from an audio source using audio streaming functionality, to said interactive voice response unit in communication with said telephone for listening by said user via said telephone;
    a content manager, the transcoder and the interactive voice response (IVR) unit responsive to the content manager for directing the audio stream; and
    a cache, the cache responsive to the content manager for selectively receiving and rendering the directed audio stream, the telephone providing the user interface enabling said user to select a portion of the audio content, the system further operable to:

receive a set of available preconfigured locations having the audio content;
select a location of the portion from among the preconfigured locations;
receive a semaphore command indicative of the portion;
identify the portion by delimiting the portion with a semaphore, the semaphore delimited portion operable for selective storage, recall and rendering from the user interface;
assign an IVR interface coupled to the transcoder for receiving the portion from the selected location, the IVR interface assigned by a content manager operable to assign a plurality of IVR interfaces; and
receive the portion via the assigned IVR interface.

11. A system according to claim 10 and wherein said audio content selected by said user is delimited by a frequency range.

12. A system according to claim 10 and wherein said audio content selected by said user is delimited by a temporal range.

13. A system according to claim 10 and wherein said telephone provides said user interface enabling said user to selectably operate on a portion of said audio content by carrying out at least one of the following operations:
storage of said portion;
transmittal of a link to a stored said portion via a computer network;
transmittal of said portion via said computer network;
playing of said portion; and
manipulation of said portion.

14. A system according to claim 10 wherein said audio content is received from a PSTN audio source.

15. A system according to claim 13 and wherein said telephone provides said user interface enabling said user to select said portion of said audio content.

16. A system according to claim 13 and wherein said telephone provides said user interface enabling said user to selectably operate on said portion of said audio content.

17. A system according to claim 10 and wherein said transcoder employs at least one of the following protocols in providing said audio data from said audio source remote from said transcoder to said interactive voice response unit:

---
MP3;
REAL AUDIO;
WINDOWS MEDIA;
RTSP;
RTP;
HTTP;
MGCP; and
VoIP.
---

18. A system for transmission of audio content to a telephone comprising:
an audio content transmitter receiving audio content from a source of audio content, said audio content transmitter being operative for transmitting to a telephone a portion of said audio content; and
at least one telephone being operative to enable a user to select said portion of said audio content via said telephone and to receive said portion of said audio content to provide an audio output;
the audio content transmitter further comprising:
a content manager having a transcoder and an interactive voice response (IVR) unit responsive to the content manager for directing the audio content; and
a cache, the cache responsive to the content manager for selectively receiving and rendering the directed audio content, the telephone providing the user interface enabling said user to select a portion of the audio content, the system further operable to:
receive a set of available preconfigured locations having the audio content;
select a location of the portion from among the preconfigured locations;
receive a semaphore command indicative of the portion, the semaphore based on an offset into the audio stream;
identify the portion by delimiting the portion with a semaphore, the semaphore delimited portion operable for selective storage; recall and rendering from the user interface;
assign an IVR interface coupled to the transcoder for receiving the portion from the selected location, the IVR interface assigned by a content manager operable to assign a plurality of IVR interfaces; and
receive the portion via the assigned IVR interface.

19. A system according to claim 18 and wherein said at least one telephone is operative to enable said user to select said portion of said audio content by a speech input.

20. A system according to claim 18 and also comprising an IVR which is in communication with said at least one telephone and with said at least one audio content transmitter and which is operative to enable said user to select said portion of said audio content by a speech input via said telephone.

21. A system according to claim 18 and wherein said portion of said audio content is delimited by a frequency range.

22. A system according to claim 18 and wherein said portion of said audio content is delimited by a temporal range.

23. A system according to claim 18 and wherein said telephone provides a user interface enabling said user to selectably operate on said portion of said audio content by carrying out at least one of the following operations:
storage of said portion;
transmittal of a link to a stored said portion via a computer network;
transmittal of said portion via said computer network;
playing of said portion; and
manipulation of said portion.

24. A system according to claim 18 wherein said audio content is received from a PSTN audio source.

25. A system according to claim 18 and wherein said system employs at least one of the following protocols in providing said audio content from said audio source remote from said transcoder to an interactive voice response unit:

---
MP3;
REAL AUDIO;
WINDOWS MEDIA;
RTSP;
RTP;
HTTP;
M6CP; and
VoIP.
---

* * * * *